(12) United States Patent
Malet

(10) Patent No.: US 9,095,189 B2
(45) Date of Patent: *Aug. 4, 2015

(54) AGING-RESISTANT COPOLYMERS COMPRISING POLYAMIDE BLOCKS AND POLYETHER BLOCKS

(75) Inventor: Frederic Malet, Rouen (FR)

(73) Assignee: ARKEMA FRANCE, Colombes (FR)

( * ) Notice: Subject to any disclaimer, the term of this patent is extended or adjusted under 35 U.S.C. 154(b) by 95 days.

This patent is subject to a terminal disclaimer.

(21) Appl. No.: 11/522,255

(22) Filed: Sep. 15, 2006

(65) Prior Publication Data

US 2007/0066725 A1    Mar. 22, 2007

(30) Foreign Application Priority Data

Sep. 16, 2005  (FR) ...................... 05 09465

(51) Int. Cl.
*A43B 13/04* (2006.01)
*C08K 5/00* (2006.01)

(52) U.S. Cl.
CPC ................. *A43B 13/04* (2013.01); *C08K 5/005* (2013.01)

(58) Field of Classification Search
CPC ......... A43B 13/04; C08K 5/005; C08L 77/00
USPC .......... 524/95, 96, 97, 99, 100, 102, 126, 227
See application file for complete search history.

(56) References Cited

U.S. PATENT DOCUMENTS

| | | | | |
|---|---|---|---|---|
| 4,803,894 A | * | 2/1989 | Howell | 74/594.6 |
| 5,380,774 A | * | 1/1995 | Mulholland | 524/182 |
| 5,414,033 A | * | 5/1995 | Nesvadba | 524/117 |
| 5,624,994 A | * | 4/1997 | Hert et al. | 524/505 |
| 5,658,984 A | * | 8/1997 | Ishii et al. | 525/66 |
| 5,811,495 A | | 9/1998 | Kirikihira et al. | |
| 5,969,014 A | * | 10/1999 | Webster et al. | 524/100 |
| 2002/0077393 A1 | * | 6/2002 | Gugumus | 524/99 |
| 2003/0065107 A1 | * | 4/2003 | Lacroix et al. | 525/419 |
| 2003/0189192 A1 | * | 10/2003 | Girelli et al. | 252/400.21 |
| 2003/0191239 A1 | * | 10/2003 | Gugumus | 525/30 |
| 2004/0018895 A1 | * | 1/2004 | Bulpett et al. | 473/378 |
| 2005/0165210 A1 | * | 7/2005 | Malet et al. | 528/310 |

FOREIGN PATENT DOCUMENTS

JP    61289119    12/1986

OTHER PUBLICATIONS

STN Search Report pp. 1-11.*
Mark Alger, "Polymer Science Dictionary, 2nd Edition", Chapman & Hall, New York p. 361, (1997).*
STN Search Report pp. 1-4.*
Ciba TINUVIN 144—Ciba Specialty Products, pp. 1-3, Sep. 12, 997.*
STN Search Report pp. 1-6.*
STN Seach Report—pp. 1-2.*

* cited by examiner

Primary Examiner — Alexander Kollias
(74) Attorney, Agent, or Firm — RatnerPrestia

(57) ABSTRACT

The present invention relates to compositions based on a copolymer comprising homo- or copolyamide polyamide blocks (PA blocks), with the exclusion of completely aromatic PA blocks, and polyether blocks comprising:
a) 500 to 10 000 ppm of at least one phenolic antioxidant;
b) 0 to 5000 ppm of at least one antioxidant based on phosphorus or based on sulphur;
c) 0 to 5000 ppm of at least one UV absorber;
d) 200 to 3000 ppm of at least one methylated hindered amine light stabilizer or HALS and/or 200 to 1300 ppm of at least one nonmethylated HALS.

12 Claims, 2 Drawing Sheets

AGING-RESISTANT COPOLYMERS COMPRISING POLYAMIDE BLOCKS AND POLYETHER BLOCKS

This application claims benefit, under U.S.C. §119(a) of French National Application Number FR 05.09465, filed Sep. 16, 2005.

FIELD OF THE INVENTION

The present invention relates to copolymers comprising polyamide blocks and polyether blocks which are resistant to ageing and more particularly to ageing due to heat and/or UV (ultraviolet) radiation. Copolymers comprising polyamide blocks and polyether blocks are also known as poly(ether-block-amide)s (PEBA); they are thermoplastic elastomers. They are also known as polyamide elastomers. These copolymers are of use in manufacturing objects such as shoe soles, in particular of sports shoes.

BACKGROUND OF THE INVENTION

The prior arts have disclosed numerous copolymers comprising polyamide blocks and polyether blocks and numerous uses of these copolymers. Antioxidants and UV inhibitors are mentioned in these prior arts. The document JP-61-289119-A1 discloses PEBA compositions additivated with one or more additives for improving the light and heat stability, it being possible for the light stabilizer to be hindered amine compounds.

SUMMARY OF THE INVENTION

However, it is found that many mixtures of additives protect against oxidation and UV radiation but cause an unsightly yellowing of the final composition characterized by a yellow index, abbreviated to YI.

It has now been discovered that not just any antioxidant or any UV inhibitor can be used if it is desired to obtain a composition with a low yellow index. This is because at least two additives are necessary: (a) a phenolic antioxidant and (d) a hindered amine light stabilizer or HALS, and it is necessary for the said HALS to be present in the composition in very precise proportions, especially if it is nonmethylated.

DETAILED DESCRIPTION OF THE INVENTION

Figure 1:
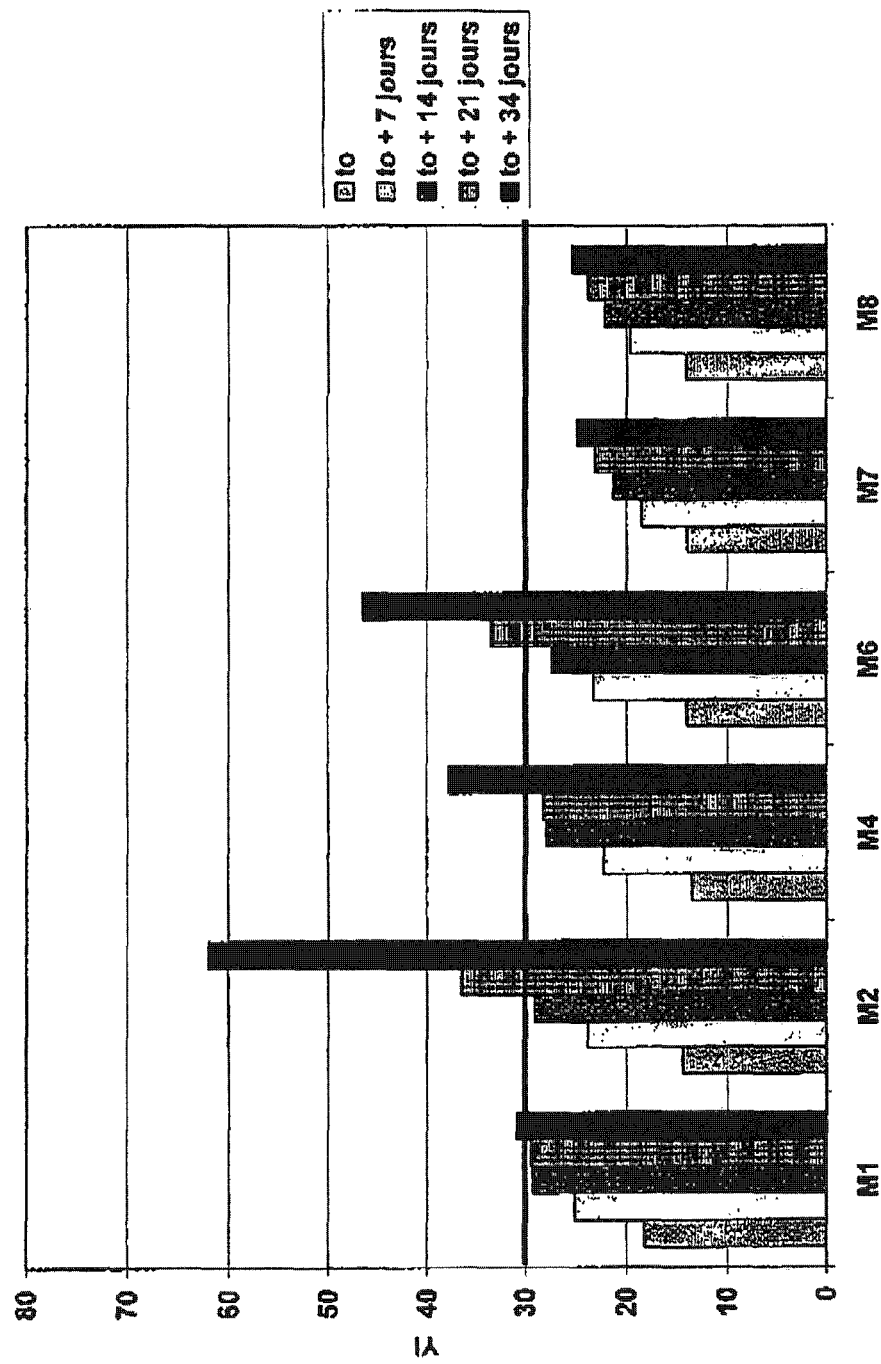
FIGS. 1 and 2 show the change in Yellow Indexes (YI) of several different compositions for different lengths of aging.

The present invention relates to a composition based on a PEBA copolymer, that is to say a copolymer comprising homo- or copolyamide polyamide blocks (abbreviated to PA blocks), with the exclusion of completely aromatic PA blocks, and polyether blocks (abbreviated to PE blocks) comprising:
a) 500 to 10 000 ppm of at least one phenolic antioxidant;
b) 0 to 5000 ppm of at least one antioxidant based on phosphorus or based on sulphur;
c) 0 to 5000 ppm of at least one UV absorber;
d) 200 to 3000 ppm of at least one methylated hindered amine light stabilizer or HALS and/or 200 to 1300 ppm of at least one nonmethylated hindered amine light stabilizer or HALS;
ppm meaning parts per million of total composition.

It would not be departing from the scope of the invention to replace at least two of these additives (a) to (d) by a single additive (a), (b), (c) or (d) fulfilling the same functions as the said single additives.

These functions can be:
function of phenolic antioxidant (a);
function of antioxidant based on phosphorus or based on sulphur (b);
function of UV absorber (c);
function of hindered amine light stabilizer (d).

For example, TUNUVIN 144 fulfils both a function of phenolic antioxidant and a function of hindered amine light stabilizer.

These additives can be introduced into the PEBA copolymers during their synthesis or subsequently, by dry blending, or into the said PEBA copolymers in the melt. Advantageously, a masterbatch of these additives is prepared, that is to say a resin, preferably of PEBA copolymer or copolyamide type, for example comprising 10 to 30% by weight of these additives, and then this masterbatch is added in a proportion of a few percent to the PEBA copolymers which it is desired to stabilize. This masterbatch can be manufactured according to the usual techniques for thermoplastics by introducing the additives into the PEBA copolymers in the melt in an extruder or any equivalent device.

Advantageously, the proportion of (a) is between 2000 and 8000 ppm and preferably between 3000 and 6000.

Advantageously, the proportion of (b) is between 1000 and 2000 ppm and preferably between 1200 and 1700.

Advantageously, the proportion of (c) is between 1000 and 2000 ppm and preferably between 1200 and 1700.

Advantageously, the proportion of HALS (d), when the latter is methylated, is between 200 and 3000 ppm, preferably between 300 and 2000, more preferably still between 400 and 1000 and, when the latter is nonmethylated, is between 200 and 1300 ppm, preferably between 200 and 800, more preferably still between 300 and 700.

The PEBA copolymers result from the copolycondensation of polyamide sequences comprising reactive ends with polyether sequences comprising reactive ends, the said polyamide sequences being aliphatic or semi-aromatic, the completely aromatic polyamide sequences with which the document EP 608 976 is concerned being expressly excluded from our invention.

It is a matter of, inter alia:
1) Polyamide sequences comprising diamine chain ends with polyoxyalkylene sequences comprising dicarboxyl chain ends.
2) Polyamide sequences comprising dicarboxyl chain ends with polyoxyalkylene sequences comprising diamine chain ends obtained by cyanoethylation and hydrogenation of aliphatic α,ω-dihydroxylated polyoxyalkylene sequences known as polyetherdiols.
3) Polyamide sequences comprising dicarboxyl chain ends with polyetherdiols, the products obtained being, in this specific case, polyetheresteramides. The copolymers of the invention are advantageously of this type.

The polyamide sequences comprising dicarboxyl chain ends originate, for example, from the condensation of precursors of polyamides in the presence of a chain-limiting dicarboxylic acid.

The polyamide sequences comprising diamine chain ends originate, for example, from the condensation of precursors of polyamides in the presence of a chain-limiting diamine.

The PEBA polymers can also comprise randomly distributed units. These polymers can be prepared by the simultaneous reaction of the polyether and of the precursors of the polyamide blocks.

For example, polyetherdiol, polyamide precursors and a chain-limiting diacid can be reacted. A polymer is obtained which has essentially polyether blocks and polyamide blocks, the latter being of highly variable length, but also the various reactants which have reacted randomly, which are distributed randomly (statistically) along the polymer chain.

Polyetherdiamine, polyamide precursors and a chain-limiting diacid can also be reacted. A polymer is obtained which has essentially polyether blocks and polyamide blocks, the latter being of highly variable length, but also the various reactants which have reacted randomly, which are distributed randomly (statistically) along the polymer chain.

The polyether blocks (PE blocks) can represent 5 to 85% by weight of the copolymer comprising polyamide and polyether blocks. The polyether blocks are composed of alkylene oxide units. These units can, for example, be ethylene oxide units, propylene oxide units, trimethylene ether units (such copolymers with poly(trimethylene ether) blocks are disclosed in U.S. Pat. No. 6,590,065) or tetrahydrofuran units (which results in poly(tetramethylene glycol) series). PEG blocks, that is to say those composed of ethylene oxide units, PPG blocks, that is to say those composed of propylene oxide units, poly(trimethylene ether) blocks and PTMG blocks, that is to say those composed of tetramethylene glycol units, also known as polytetrahydrofuran blocks, are thus used. The PEBA copolymers can comprise several types of polyethers in their chain. Mention may also be made of block or random copolyethers. The amount of polyether blocks in these PEBA copolymers is advantageously from 10 to 70% by weight of the copolymer and preferably from 35 to 60%.

The polyetherdiol blocks are either used as is and copolycondensed with polyamide blocks comprising carboxyl ends or are aminated, in order to be converted to polyetherdiamines, and condensed with polyamide blocks comprising carboxyl ends. They can also be mixed with polyamide precursors and a chain-limiting diacid in order to prepare polymers comprising polyamide blocks and polyether blocks having randomly distributed units.

The number-average molar mass $\overline{Mn}$ of the polyamide sequences can be between 500 and 10 000 and preferably between 500 and 6000. The mass $\overline{Mn}$ of the polyether sequences can be between 100 and 6000 and preferably between 200 and 3000.

These PEBA polymers, whether they originate from the copolycondensation of polyamide and polyether sequences prepared beforehand or from a one-stage reaction, exhibit, for example, an intrinsic viscosity between 0.8 and 2.5, measured in meta-cresol at 25° C. for an initial concentration of 0.5 g per 100 g 0.8 g/100 ml. The preparation of these copolymers is described in the prior art. Mention may be made, for example, of Patents WO 04/037898, EP 1 262 527, EP 1 270 211, EP 1 136 512, EP 1 046 675, EP 1 057 870, EP 1 155 065, EP 506 495 and EP 504 058.

The invention is of particular use for PEBA polymers which have PA 12, PA 11 or PA 6 PA blocks and PTMG, PEG or PPG PE blocks. The polyamide blocks can be copolyamides.

As regards the phenolic antioxidant (a), mention may be made, as examples, of IRGANOX® 1010 (CAS No.: 6683-19-8; pentaerythritol tetrakis(3-(3,5-di-tert-butyl-4-hydroxyphenyl)propionate)), IRGANOX® 1098 (CAS No.: 23128-74-7; N,N'-hexamethylene bis[3-(3,5-di-t-butyl-4-hydroxyphenyl)propionamide]) and IRGANOX® 245 (CAS No.: 36443-68-2; ethylenebis(oxyethylene)bis-(3-(5-tert-butyl-4-hydroxy-m-tolyl)-propionate)). These are hindered phenols.

As regards the antioxidant of phosphite type or based on sulphur (b), mention may be made, as examples, of ADK STAB® PEP 36 (CAS No.: 80693-00-1; bis(2,6-di-ter-butyl-4-methylphenyl)pentaerythritol-di-phosphite), ADK STAB® PEP8HT (CAS NO.: 3806-34-6; 3,9-bis(octadecyloxy)-2,4,8,10-tetraoxa-3,9-diphosphaspiro[5.5]undecane) from Adeka Palmarole and DOVERPHOS® 9228 (CAS No.: 154862-43-8; (2,4-dicumylphenyl)pentaerythritol diphosphite) from Dover Chemical.

As regards the UV absorber, mention may be made, as examples, of TINUVIN® 320 (CAS No.: 3846-71-7; 2-benzotriazol-2-yl-4,6-di-tert-butylphenol), TINUVIN® 350 (CAS No.: 36437-37-3; 2-(2H-benzotriazol-2-yl)-4-(tert-butyl)-6-(sec-butyl)phenol), TINUVIN® 312 (CAS No.: 23949-66-8; N-(2-ethoxyphenyl)-N'-(4-ethylphenyl)-ethylene diamide) from CIBA.

As regards the hindered amine light stabilizer abbreviated to HALS (d), its content in the final composition should be relatively low in order to limit the negative impact on the YI during thermal tests or in order to limit the interaction with hindered phenols. The absence of HALS in the composition (with or without UV absorber in the composition) significantly reduces the UV resistance.

Mention may be made, as methylated HALS, of TINUVIN® 765 (CAS Nos.: 41556-26-7 and 8291-37-7; mixture of bis(1,2,2,6,6-pentamethyl-4-piperidyl)sebacate and methyl-1,2,2,6,6-pentamethyl-4-piperidyl sebacate) and TINUVIN® 144 (CAS No.: 63843-89-0; bis(1,2,2,6,6-pentamethyl-4-piperidinyl)-2-butyl-2-(4-hydroxy-3,5-di-tert-butylbenzyl) propanedioate) from CIBA, ADK STAB® LA52 (CAS No.: 91788-83-9; tetrakis(1,2,2,6,6-pentamethyl-4-piperidyl) 1,2,3,4-butanetetracarboxylate) from Adeka Palmarole and CHIMASSORB® 119 (CAS No.: 106990-43-6; N,N'''-[1,2-ethane-diyl-bis[[[4,6-bis-[butyl-(1, 2,2,6,6-pentamethyl-4-piperidinyl)amino]-1,3,5-triazine-2-yl]imino]-3,1-propanediyl]]bis-[N',N''-dibutyl-N',N''-bis(1, 2,2,6,6-pentamethyl-4-piperidinyl)-1,3,5-triazine-2,4,6-triamine) from CIBA. Mention may be made, as nonmethylated HALS, of TINUVIN® 770 (CAS No.: 52829-07-9; bis(2,2,6,6-tetramethyl-4-piperidyl) sebacate) from CIBA and NYLOSTAB® SEED (CAS No.: 42774-15-2; N1,N3-bis(2,2,6,6-tetramethyl-4-piperidinyl)-1,3-benzenedicarboxamide) from Clariant. Preferably, it is a methylated HALS, more effective than a nonmethylated HALS.

The mass of the HALS (between 500 and 1000 g/mol) may not be excessively high, in order for the latter to be able to migrate into the surface. However, in the case of a transparent matrix, the mass of the HALS may be higher since it has to be present throughout and therefore does not have to migrate.

All these additives are described in "Stabilization of Polymeric Materials", Zweifel, H., 1998, Springer-Verlag, Berlin Heidelberg New York, ISBN: 354061690X.

The PEBA copolymer compositions can comprise, in addition to the preceding additives, plasticizers, fillers or colorants.

Use was made of a copolymer comprising polyamide blocks of PA 12 type and polyether blocks of PTMG type, referred to as PEBA 1, to which various combinations of additives (a) to (d) were added in the melt, at various contents, in order to manufacture compositions M1 to M11 of Table 1 below. The proportions of additives in Table 1 are expressed in parts per $10^6$ parts of total mixture (PEBA+additives). The various compositions were subsequently tested for their resistance to thermal oxidation and to photo-oxidation.

In the first case (thermal oxidation), 100×100×1 mm³ plaques were placed in an oven at 90° C. and the change in the coloration was measured. The YI of plaques with compositions M1, M2, M4, M6, M7, M8 (see FIGS. 1 and 2) is measured with the following parameters: illuminant D65/ observer 10°.

In the second case (photo-oxidation), 100×100×1 mm³ plaques were placed in a Sepap® 12.24 chamber and the time necessary for the appearance of surface cracking is measured; this time is denoted by "UV resistance" in Table 1.

Figure 2:
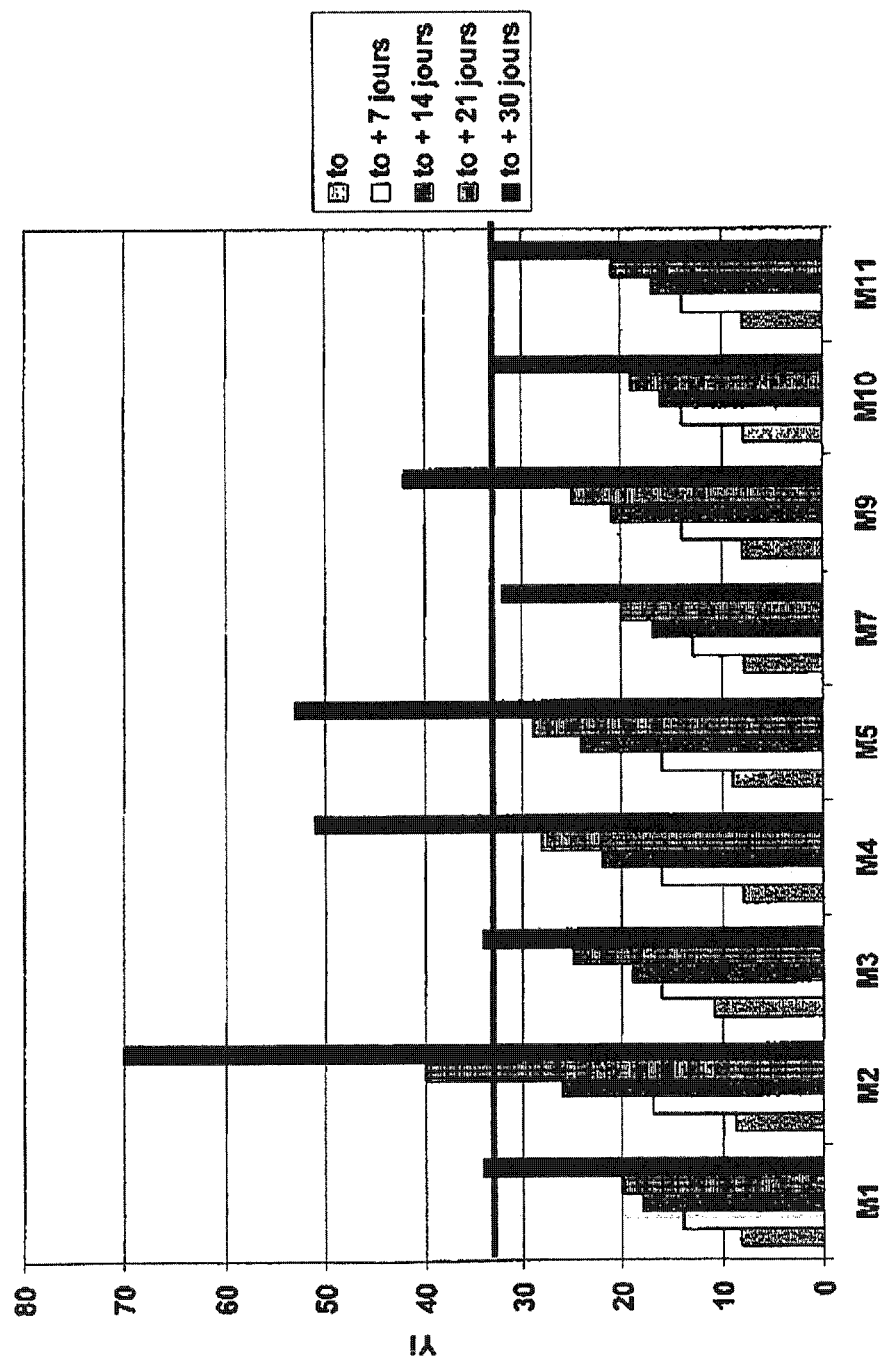

The change in the Yellow Index, abbreviated to YI (on the ordinate), of the compositions M1 to M11 during 2 tests carried out separately as a function of the exposure time, expressed in days, is shown in FIGS. 1 and 2. In FIG. 1, the YI has been represented successively from left to right at $t_0$ (initial time), $t_0$+7 days, $t_0$+14 days, $t_0$+21 days and $t_0$+34 days for each composition M during a first test. In FIG. 2, the YI has been represented successively from left to right at $t_0$ (initial time), $t_0$+7 days, $t_0$+14 days, $t_0$+21 days and $t_0$+30 days for each composition M during a second test.

It is observed that the reduction in the content of HALS (see M9 vs. M5) makes it possible to reduce the change in the YI. However, the use of methylated HALS (M8, M10 and M11) or the absence of HALS (M3, M7) is even more effective in limiting the change in the YI. However, Table 1 shows that, in order to maintain a good UV resistance, the presence of HALS is necessary, hence the good UV/yellow index compromise obtained using very little nonmethylated HALS and/or a methylated HALS.

TABLE 1

| | Compositions | | | | | | | | | | |
|---|---|---|---|---|---|---|---|---|---|---|---|
| | M1 | M2 | M3 | M4 | M5 | M6 | M7 | M8 | M9 | M10 | M11 |
| IRGANOX ® 1010 | 2000 | 3700 | 5000 | 5400 | 5400 | 5400 | 5400 | 5400 | 5400 | 5400 | 5400 |
| TINUVIN ® 320 | | | 5000 | | | | | | | | |
| TINUVIN ® 350 | | 1500 | | | | | | | | | |
| TINUVIN ® 312 | | | | 5000 | 1500 | 5000 | 5000 | 5000 | 1500 | 1500 | 1500 |
| TINUVIN ® 770 | | 1500 | | 1000 | 1000 | | | | 500 | | |
| TINUVIN ® 144 | | | | | | | | | | 500 | |
| CHIMASORB ® 119 | | | | | | | | 1000 | | | |
| NYLOSTAB ® SEED | | | | | | 1000 | | | | | |
| ADK STAB ® LA-52 | | | | | | | | | | | 500 |
| ADK STAB ® PEP 36 | | | | 1500 | 1500 | 1500 | 1500 | | 1500 | 1500 | 1500 |
| ADK STAB ® PAP 8HT | | 2000 | | | | | | | | | |
| DOVERPHOS 9228 | | | | | | | | 1500 | | | |
| UV resistance (h) | 160 | >1800 | 400 | >1800 | >1800 | | 190 | | 1300 | 800 | 700 |

The invention claimed is:

1. A copolymer composition comprising:
a copolymer of polyamide blocks, and polyether blocks, wherein the copolymer does not comprise completely aromatic polyamide blocks, the copolymer composition further comprising
a) 3,000 to 8,000 ppm of at least one hindered phenolic antioxidant, wherein the at least one hindered phenolic antioxidant comprises pentaerythritol tetrakis(3-(3,5-di-tert-butyl-4-hydroxyphenyl)propionate);
b) 1,000 to 5,000 ppm of at least one antioxidant selected from the group consisting of bis(2,6-di-ter-butyl-4-methylphenyl)pentaerythritol-di-phosphite- and bis(2,4 dicumylphenyl)pentaerythritol diphosphate;
c) 1,000 to 5,000 ppm of at least one UV absorber, wherein the at least one UV absorber comprises N-(2-ethoxyphenyl)-N'-(4-ethylphenyl)-ethylene diamide;
d) 400 to 1,000 ppm of a methylated hindered amine light stabilizer and no nonmethylated HALS, wherein the methylated hindered amine light stabilizer is selected from the group consisting of tetrakis(1,2,2,6,6-pentamethyl-4-piperidyl) 1,2,3,4-butanetetracarboxytate and N',N'''-[1,2-ethane-diyl-bis[[[4,6-bis-[butyl-(1,2,2,6,6-pentamethyl-4-piperidinyl)amino]-1,3,5-triazine-2-yl] imino]-3,1-propanediyl]]bis-[N',N''-dibutyl-N',N''-bis (1,2,2,6,6-penta methyl-4-piperidinyl)-1,3,5-triazine-2, 4,6-triamine, and a mixture of bis(1,2,2,6,6-pentamethyl-4-piperidinyl)sebacate and methyl-1,2,2,6, 6-pentamethyl-4-piperidyl sebecate.

2. The copolymer composition according to claim 1, wherein the level of the at least one hindered phenolic antioxidant (a) is between 3,000 and 6,000 ppm.

3. The copolymer composition according to claim 1, wherein the level of the at least one antioxidant (b) is between 1,000 and 2,000 ppm.

4. The copolymer composition according to claim 1, wherein the level of the at least one antioxidant (b) is between 1,200 and 1,700 ppm.

5. The copolymer composition according to claim 1, wherein the level of the at least one UV absorber (c) is between 1,000 and 2,000 ppm.

6. The copolymer composition according to claim 1, wherein the level of the at least one UV absorber (c) is between 1,200 and 1,700 ppm.

7. The copolymer composition according to claim 1, wherein the polyamide blocks are polyamide 12, polyamide 11 or polyamide 6 blocks and the polyether blocks are polytetramethylene glycol, polyethylene glycol or polypropylene glycol blocks.

8. The copolymer composition according to claim 1, wherein the polyether blocks are 5 to 85% by weight of the copolymer.

9. The copolymer composition according to claim 1, wherein the methylated hindered amine light stabilizer has a molecular weight between 500 and 1,000 g/mol.

10. An article comprising the copolymer composition according to claim 1.

11. The article of claim 10, wherein said article is a shoe sole.

12. A copolymer composition comprising:
a copolymer of polyamide blocks, and polyether blocks, wherein the copolymer does not comprise completely aromatic polyamide blocks, the copolymer composition further comprising stabilizers consisting of:
a) 3,000 to 8,000 ppm of at least one hindered phenolic antioxidant, wherein the at least one hindered phenolic antioxidant comprises pentaerythritol tetrakis(3-(3,5-di-tert-butyl-4-hydroxyphenyl)propionate);

b) 1,000 to 5,000 ppm of at least one antioxidant based on phosphorus, wherein the at least one antioxidant based on phosphorus is selected from the group consisting of bis(2,6-di-ter-butyl-4-methylphenyl)pentaerythritol-diphosphite and bis(2,4-dicumylphenyl)pentaerythritol diphosphate;

c) 1,000 to 5,000 ppm of at least one UV absorber, wherein the at least one UV absorber comprises N-(2-ethoxyphenyl)-N'-(4-ethylphenyl)-ethylene diamide; and d) 400 to 1,000 ppm of single methylate hindered amine light stabilizer and no nonmethylated hindered amine light stabilizer, wherein the methylated hindered amine light stabilizer is selected from the group consisting of tetrakis(1,2,2,6,6-pentamethyl-4-piperidyl) 1,2,3,4-butanetetracarboxylate, N,N"-[1,2-ethane-diyl-bis[[[4,6-bis-[butyl-(1,2,2,6,6-penta methyl-4-piperidinyl) amino]-1,3,5-triazine-2-yl]imino]-3,1-propanediyl]] bis-[N',N"-dibutyl-N,N"-bis(1,2,2,6,6-pentamethyl-4-piperidinyl)-1,3,5-triazine-2,4,6-triamine, and a mixture of bis(1,2,2,6,6-pentamethyl-4-piperidyl)sebacate and methyl-1,2,2,6,6-pentamethyl-4-piperidyl sebecate.

\* \* \* \* \*